United States Patent [19]

Fischer

[11] 3,840,695

[45] Oct. 8, 1974

[54] LIQUID CRYSTAL IMAGE DISPLAY PANEL WITH INTEGRATED ADDRESSING CIRCUITRY

[75] Inventor: Albert G. Fischer, Pittsburgh, Pa.

[73] Assignee: Westinghouse Electric Corporation, Pittsburgh, Pa.

[22] Filed: Oct. 10, 1972

[21] Appl. No.: 296,425

[52] U.S. Cl. ............. 358/61, 350/150, 350/160 LC

[51] Int. Cl. ......................... H04m 3/14, H04m 9/30

[58] Field of Search ........ 178/5.4 BD, 7.3 D, 5.4 R, 178/7.5 D, 5.4 EL; 340/166 R, 324 M, 166 EL; 315/169 TV; 350/150

[56] References Cited

UNITED STATES PATENTS

| | | | |
|---|---|---|---|
| 2,493,200 | 1/1950 | Land | 178/5.4 BD |
| 2,705,903 | 4/1955 | Marshall | 178/5.4 BD |
| 2,928,993 | 3/1960 | Liebson | 178/5.4 EL |
| 3,564,135 | 2/1971 | Weimer | 178/7.3 D |
| 3,569,614 | 3/1971 | Hanlon | 178/5.4 BD |
| 3,647,958 | 3/1972 | Sobel | 178/7.3 D |
| 3,731,986 | 5/1973 | Fergason | 350/160 |
| 3,785,721 | 1/1974 | Harsch | 350/150 |

OTHER PUBLICATIONS

Lechner, Liquid Crystal Matrix Displays, IEEE Proc., Nov. 1971, p. 1,572, FIG. 13, TK5700.I7.

*Primary Examiner*—Robert L. Richardson
*Assistant Examiner*—Mitchell Saffian
*Attorney, Agent, or Firm*—W. G. Sutcliff

[57] ABSTRACT

A flat, non-vacuum display panel using a lightmodulating layer of a voltage-dependent, optically active material of twisted nematic liquid crystals, X-Y matrix addressed by an array of coextensive, vacuum-deposited, interconnected thin film transistors which are scanned from the periphery of the flat panel by electronic shift registers. The panel is illuminated from the rear by white light, which passes a mosaic color filter for color television display. The invention hereindescribed was made in the course of or under a contract with the U.S. Air Force.

10 Claims, 6 Drawing Figures

LIQUID CRYSTAL IMAGE DISPLAY PANEL WITH INTEGRATED ADDRESSING CIRCUITRY

BACKGROUND OF THE INVENTION

The conventional cathode ray tube has certain disadvantages. It is a heavy and bulky device and also can implode. However, the cathode ray tube has not been replaced by any of the non-vacuum flat television screen displays proposed in the past. These proposed, X–Y addressed flat display screens included such devices as arrays of electroluminescent light emitting diodes wherein an electric current selectively addressed the electroluminescent elements to cause the emission of light. Other proposed systems utilized screens which modulated a high intensity light source. These light modulating devices normally made use of phenomena such as the Kerr and the Pockel's effect, and also dynamic scattering within liquid crystals. A general article on the liquid crystal type displays is found in the Proceedings of the IEEE volume 59, No. 11, Nov. 1971 on page 1566. The complexity of the addressing circuitry associated with these display devices, and the complexity of the manufacture of such a panel are crucial problems in the fabrication of these devices. In the present invention, the problems of providing 750,000 matrix-addressed red, green and blue elements are solved.

SUMMARY OF THE INVENTION

This invention is directed to a flat color television display panel wherein there is complete integration at the panel level, of the driving circuits and the display medium. Thin film device technology is utilized for the generation of the required large area circuits. The panel comprises a flat, thin film transistor matrix addressed transparent TV panel based on twisted nematic liquid crystal light valves illuminated from the rear by white light through a mosaic color film filter.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENTS

Figure 3:
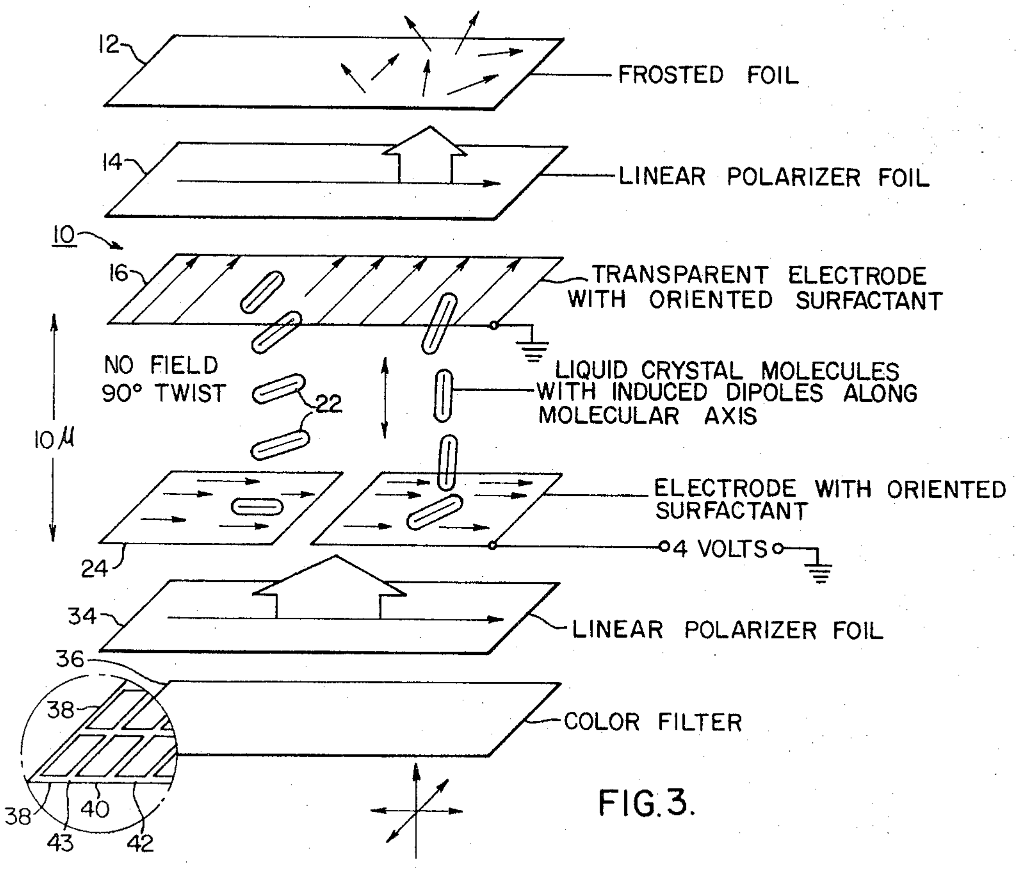
FIG. 3 is a schematic view of the panel shown in FIG. 2 to illustrate and explain the invention.
Figure 1:
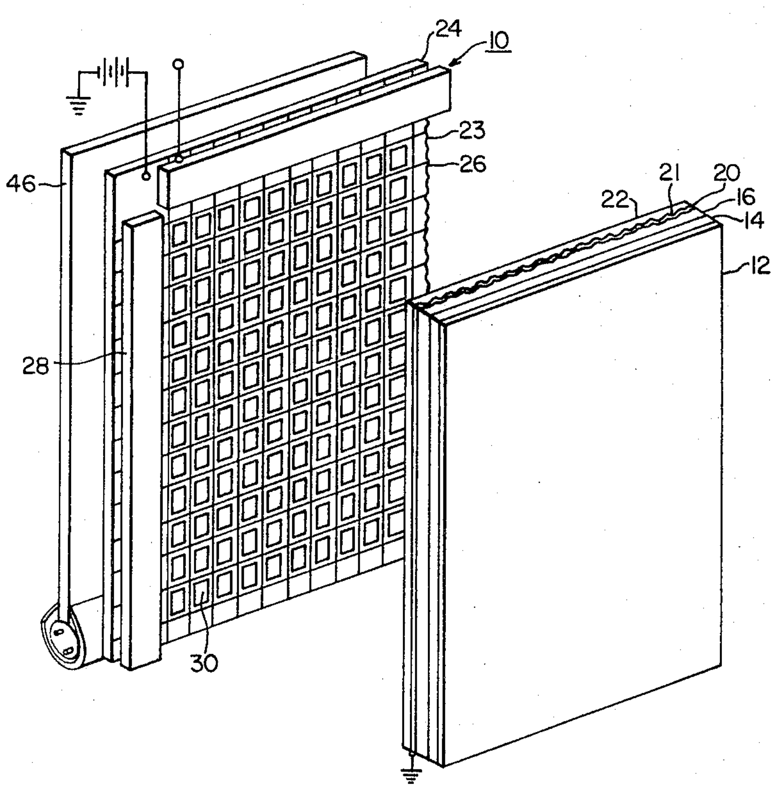
FIG. 1 is an exploded view of a color display panel incorporating the teachings of this invention.
Figures 2, 4:
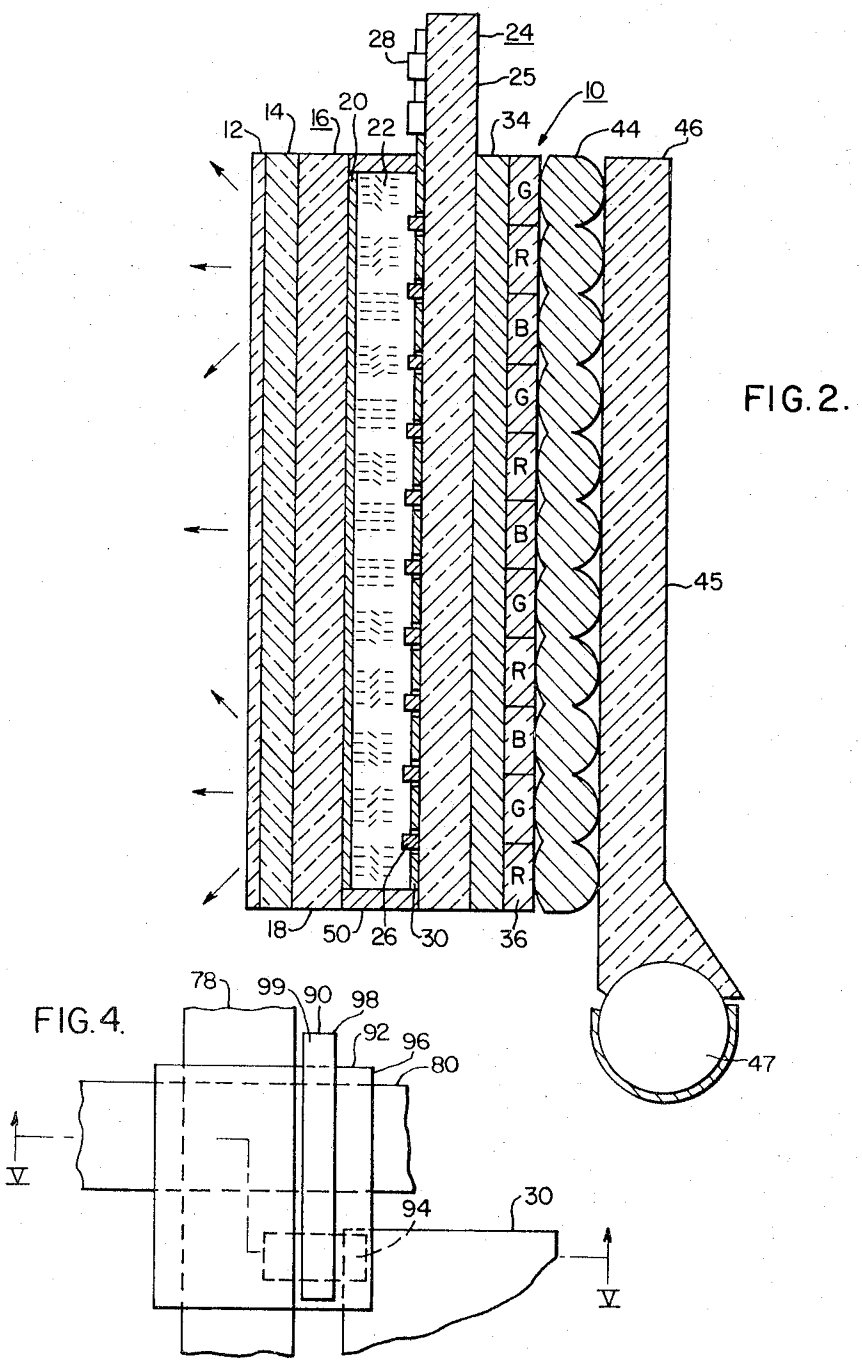
FIG. 2 is a vertical sectional view of the panel illustrated in FIG. 1.
FIG. 4 is an enlarged plan view of a portion of the back panel shown in FIG. 1.

Referring now to FIGS. 1, 2 and 3, a rectangular panel display assembly 10 is illustrated. Although the device includes 750,000 display elements, the Figures illustrate only a few elements. Starting from the front, the panel 10 is comprised of a light scattering film or foil 12 to permit viewing of the image at wide angles. The light scattering foil 12 is rectangular in shape and would have the desired dimensions of the display screen such as one foot by one foot. A suitable material for the light scattering screen 12 is a plastic foil about 1/32 inch in thickness with embossed lens. The lenses may be about 1/64 inch diameter. A simple frosted foil can also be used. A suitable light scattering screen 12 may be purchased from Edmund Scientific Company. The next planar member in the color panel 10 is a linear polarization foil 14. This polarizer 14 may be oriented in the horizontal direction and parallel to the paper as illustrated in FIG. 3 such that the light polarized in that direction will pass through while that polarized normal to that direction will not pass through the polarizer 14. A suitable polarizer 14 may have a thickness of about 1/64 inch and may be purchased from Marks Polarizer Corporation, Whitestone, New York. The polarizer foil 14 has a suitable adhesive thereon for securing the layer 14 to the light scattering layer 12.

The next element in the panel 10 is a front electrode plate 16 which includes a front glass plate member 18 of a thickness of about one-sixteenth inch with an electrical conductive coating 20 provided on the inner surface of the glass plate 18. The layer 20 is transmissive to light and may have an area resistance of 1,000 ohms/square. The inner surface of the plate 18 is provided with oriented parallel micro-grooves 21. The micro-grooves 21 shown in FIG. 1 induce parallel oriented alignment of the liquid crystal molecules provided in a liquid crystal layer 22. The micro-grooves 21 may be spaced at about 250 A and have a depth about the same dimension. The liquid crystal layer 22 may have a thickness of about 10 micrometers. The liquid crystal layer 22 is a twisted nematic liquid crystal. A suitable material is cyano-substituted benzylidene aniline or other similar molecules with their induced dipole moment parallel to the molecular axis as illustrated in FIG. 3. The specific resistivity of the layer 22 may be about $10^{11}$ to $10^{13}$ ohm. cm.

A back electrode plate 24 is next provided in the panel 10 and includes a plate 25 about one-sixteenth inch in thickness of a suitable material such as organic or inorganic glass and again is provided with micro-grooves 23 on the surface facing the liquid crystal layer 22. The micro-grooves 23 are similar to those provided on the front plate 22 but oriented perpendicular to the micro-grooves 21. A thin film transistor matrix array 26 as well as a peripheral scanning array of transistors 28 may be provided on the back electrode 24. In FIG. 1, the peripheral scanning array 28 is shown as subpanels. The plate 25 also carries multiple transparent back electrode pads 30 about 0.024 inch in height and 0.008 inch in width for the liquid crystal layer 22. The plates 25 and 18 should be optically flat, within about one-half micron. The plates 25 and 18 are sealed at edges with a shim member 50 of insulating material sealed with a suitable sealant.

The next element in the panel 10 adjacent to the back electrode plate 24 is a linear polarizer 34 which may be identical to the polarizer 14. The polarizer 34 is oriented in the same direction as polarizer 14. The next element in the panel 10 is a color filter sheet 36 about 1/64 in. thickness with a mosaic array of red, green and blue rectangular filters 38, 40 and 42 side by side to form square triads separated by a black border 43 and in exact registration with the thin film transistor matrix 26. Each filter element 38, 40 and 42 is in registration with a back electrode 30. A light parallelizer 44 is provided adjacent the color film 36 and transmits only parallel or nearly parallel light from a large area light source 46. The light parallelizer 44 is about one-eighth inch in thickness may be a louvered plastic film supplied by 3M Company, St. Paul, Minnesota. The light parallelizer 44 may also be lenticular foil firmly attached to an edge-illuminated glass plate 45, as shown in FIG. 2. The light source 46 may be about 200 ft-lambert and may be provided by a fluorescent or incandescent lamp with suitable reflectors, or an electroluminescent panel. In the specific device shown, a glass plate 45 is illuminated from edge by a lamp 47. It is of course obvious that this light source 46 may be removed in the case of utilizing the panel in sunlight, the sun serving as the light source. For projection onto a screen rather than direct viewing, the scattering foil 12 is removed, and the light source 46 is also removed and replaced by a high intensity collimated light beam. The intensity should be about 10,000 ft. lamberts or more.

In the fabrication of the liquid crystal cell 22, the desired surface orientation required to generate a stable non-deteriorating twist within the liquid crystal on the front and back electrodes 24 and 16, may be produced by unidirectionally rubbing the entire facing surfaces of the electrodes 16 and 24 with fine diamond dust to provide the micro-grooves 21 and 23. A suitable oriented surface may also be achieved by obliquely evaporated films of a suitable insulating material such as SiO. Other methods are also possible, such as producing a grating in the glass by providing a photoresist sputtering mask on the glass in the form of a grating and then back sputtering. The photoresist sputtering mask may be formed by exposing a resist coating to two interferring beams from the same Argon laser and then developing. Still another method is coating the surface with a monomolecular orientated surfactant film consisting of soap molecules such as hexadecyltriymethyl ammonium bromide directionally oriented by electric currents or liquid flow. The conducting transparent film 20 on the front electrode 16 may be provided by reactively RF sputtered $In_2O_8$:Sn. The mosaic coating of back electrode elements 30 may be formed by vacuum deposited carbon through a variable deposition mask at the end of the fabrication procedure for the thin film transistor mosaic.

The liquid crystal material is introduced by suction between the plates 16 and 24 through small openings which are then sealed. The thickness of the liquid crystal layer 22 is about 0.0005 inch. A description of the twisted nematic liquid crystal device is found in several published articles including one entitled "Voltage-Dependent Optical Activity of a Twisted Nematic Liquid Crystal," by M. Schadt and W. Helfrich, found on page 127 of Applied Physics Letters Volume 18, No. 14, Feb. 15, 1971.

Figure 6:
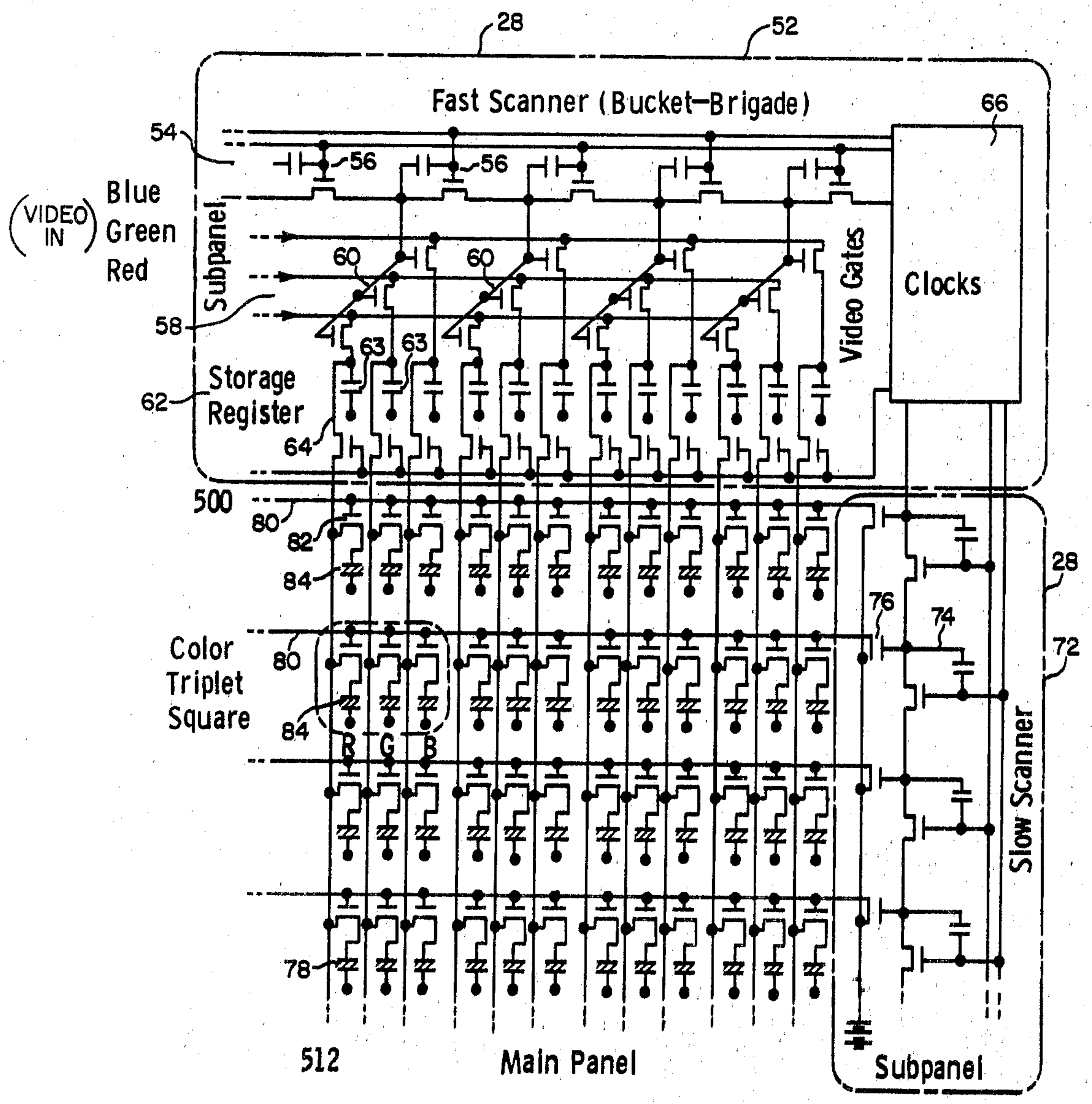
FIG. 6 is a schematic showing of the circuitry integrated into the color panel of FIG. 1.

FIG. 6 illustrates the functioning of the addressing circuitry associated with the liquid crystal layer 22. The circuitry broadly includes peripheral scanning circuitry 28 and matrix array addressing circuitry 26.

The peripheral scanning circuitry 28 includes a horizontal peripheral circuitry 52. The horizontal peripheral circuitry 52 includes a shift register 54 having 500 stages 56, a video gate system 58 having 500 × 3 stages 60, including a gate transistor each stage 60 including a gate for each color, and a storage register 62 having 500 × 3 stages 64, one for each color.

A clock 66 provides synchronizing triggering pulses for the shift register 54 and the storage register 62. The clock 66 normally consists of multivibrator circuits which are synchronized by the sync pulses provided in the incoming television signal. A suitable circuit is more fully described in Television Engineering Handbook, by Donald Fink, McGraw Hill, 1957. The vertical peripheral scanning circuitry 70 includes a slow shift register 72 with 512 stages 74, and an amplifier 76 associated with each stage 74.

The incoming video signals for red, green and blue are connected to all stages 60 of the video gate system 58. The incoming video signals are switched into the capacitor 63 of stages 64 associated with the video of storage register 62 by the horizontal shift register 54. When each stage 64 of the storage register 62 has been addressed, a sync pulse from the clock 66 discharges all capacitors 63 in the storage register 62 into vertical or Y-conductors 78. This discharge occurs during the extended flyback time of the horizontal shift register 54. The slow vertical shift register 72 has selected one horizontal or X-conductor 80 in which all thin film transistors 82 (1500) in row 80 are turned on and admit video information from the columns 78 into the elemental liquid crystal light valve capacitors 84. The row 80 is turned on for 60 microseconds during which time the horizontal shift register 54 scans through the next 500 stages. The addressed liquid crystal light valves 84 go from non-transmission in the unaddressed stage to transmission in the addressed state, the amount of transmission depending on the amplitude of the video signal on conductors 78.

In the specific device described, about seven volts are required for full on condition. In the unaddressed state, the liquid crystal layer 22 twists the plane of the incoming light by 90 degrees and therefore the light cannot pass through the polarizer 14. In the addressed state, the molecules rotate in a direction parallel to the field and the liquid crystal becomes optically inactive or isotropic. The light is now able to pass through the polarizer 14. Since each light valve 84 is associated with only one primary color filter 38, 40 or 42, each primary color is modulated according to the video signal.

A more complete description of peripheral scanning circuitry is found in an article entitled "Systems and Technologies for Solid-State Image Sensors," by Paul K. Weimer, on page 71 of RCA Review, Volume 32, June 1971. The color mosaic filter is produced by exposing Kodak Ektachrome film sheet successively with red, green and blue light through a similar multiaperture mask as that is used for producing the thin film transistor matrix. After each exposure, the mask is shifted to an adjacent position. The three rectangular primary color rectangles form a square, called triad. The panel carries 250,000 triads.

When the next row 80 is addressed, the formerly addressed row 80 of thin film transistors goes off and the charge is trapped on the capacitive reactance of the light valve element 84. This charge stays until the next addressing occurs one frame later which is 1/30 of a second. By reversing the polarity of the video signals each frame period, the twisted nematic liquid crystal elements 84 are driven by 15 Hz alternating square waves with varying amplitudes. This AC operation improves the life of the liquid crystal layer 22 and the stability of the thin film transistors. The thin film transistor stability is not critical since they are only used as on/off switches. The off resistance of the matrix thin film transistors has to be higher than $10^{10}$ ohms to maintain storage over the frame time.

The fabrication thin film transistor matrix 26 which consists of about 750,000 interconnected thin film transistors on an insulator glass panel is provided by vacuum deposition onto the micro-grooved back panel 25 through a variable multi-aperture mask. This can be accomplished in twelve evaporation steps using four different materials, in one pump down of the system. The variable multi-aperture mask consists of two superimposed sheets, each with identical patterns consisting of 750,000 square apertures. Such masks can be produced by modern step-and-repeat machines and photolithographic processing. The two masks may be shifted with respect to each other in X and Y directions, with one micron accuracy, to generate any square or rectangular aperture shapes smaller than the original aperture size of the masks, for one evaporation step. Both masks may be moved together with respect to the substrate to generate patterns larger than the aperture (by multiple evaporation steps) such as the bus bars. The same variable mask can be used to expose the color film sheet to red, green and blue light to form the mosaic filter. The peripheral scanning circuitry including the video gates and the storage register may be also fabricated with the variable multi-aperture mask arrangement, with some minor modifications.

Figure 5:
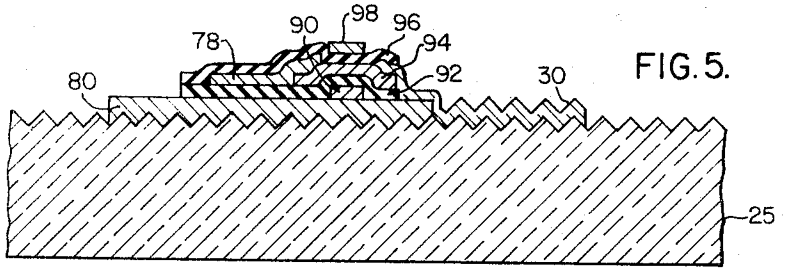
FIG. 5 is a sectional view taken along line V—V of FIG. 4.

The structural configuration of one matrix thin film transistor structure at an X-Y intersection is illustrated in FIGS. 4 and 5. The micro-grooved glass support plate 25 is the substrate. On this glass plate 25 a conductive row element 80 is deposited by the previously described process, of a suitable metallic material such as aluminum. The mask aperture is now adjusted to evaporate a gate 90 of the transistor 82. This gate 90 is connected to row or X-conductor 80. An insulating square 92 is next evaporated at the X-Y crossover. The square 92 also serves the gate insulator on the transistor 82. The square 92 may be $Al_2O_3$. A suitable semiconductor deposit 94 such as cadmium selenide is then deposited to provide the rectangular deposit 94, about 200A thick. The next step is to deposit column bar 78 which is the source electrode of the transistor 82. The material may be aluminum. The cadmium selenide deposit 94 provides the modulable current path of the transistor 82. The back electrodes 30 for the twisted nematic liquid crystal light valves are evaporated next and overly the cadmium selenide deposit 94 and thereby forms the drain electrode for the transistor 82. For better performance, a second X–Y insulator pad 96 of similar dimensions as 92 may be deposited and a second gate 98 of similar dimensions as 90 so that the semiconductor deposit 94 is sandwiched between two gates which are connected together at point 99. This enhances the thin film transistor performance and shields the semiconductor deposit 94 from light thus avoiding any possible photoconductivity.

It is obvious that other modifications may be made without departing from the scope of the invention.

What is claimed is:

1. A color television display system comprising:

a liquid crystal layer exhibiting the property of rotating the polarization plane of transmitted light in response to application of an electric field across said liquid crystal layer, a front electrode member for said liquid crystal layer comprised of a layer of electrical conductive material transmissive to light positioned on one side of said liquid crystal layer, a back electrode member transmissive to light for said liquid crystal layer comprised of a plurality of electrical conductive contact members on an insulating support member positioned on the other side of said liquid crystal layer with respect to front electrode, a thin film transistor array comprising a plurality of spaced apart interconnected transistors which are disposed upon the insulating support member side facing the liquid crystal layer, with individual transistors being spaced between the electrical conductive contact members of the back electrode member, and wherein each individual transistor of the array is connected to an individual electrical conductive contact member of the back electrode, whereby potential is selectively addressable to said back electrode contact members to thereby scan and modulate the rotation property of said liquid crystal layer, a light source and means for directing substantially parallel light toward said back electrode member, a first linear polarizer member positioned between said light source and said back electrode member, a second linear polarizer member positioned on the opposite side of said liquid crystal layer with respect to said first polarizer member, said first and second polarizer members oriented in the same direction and a color filter member comprising a plurality of spatially positioned different color filters positioned between said first polarizer member and said back electrode member, in which only one color filter aligned and associated with only one of said back electrode contact members so that only one primary color illuminates that back electrode contact.

2. The system set forth in claim 1 in which said color filter comprises at least a first and second group of filters, said first group of filters transmissive of a first color and second group of filters transmissive of a second color.

3. The system set forth in claim 2 in which said first group of filters comprise a plurality of columns of filters and second group of filters are in columns and positioned between columns of said first group.

4. The system set forth in claim 1 in which said filter members are comprised of a first, second and third group of filters in which said groups are each arranged in columns and in which columns of the first and second groups are disposed between columns of the third group.

5. The system set forth in claim 4 in which said first group of filters transmits only blue light, said second group transmits only red light and said third group transmits only green light.

6. The system set forth in claim 1 in which said liquid crystal layer is a twisted nematic liquid crystal.

7. The system set forth in claim 1 in which said means for selectively addressing said back electrode contact members comprises a plurality of parallel conductor X-bars and parallel conductor Y-bars normal to each other, and insulated from each deposited on said support plate.

8. The system set forth in claim 7 in which one of said thin film transistors of gate type is operatively associated with one of said back electrode contacts and with said X and Y conductors.

9. The system set forth in claim 8 in which said X conductor is connected to the gate of said transistor and the Y-conductor is the source electrode of said transistor and the back electrode contact is the drain electrode of said transistor.

10. A color television display system comprising:

a sealed panel comprising spaced-apart light transmissive insulative front and back support members and peripheral sealing means between the front and back support members, a liquid crystal material filling said sealed panel, which liquid crystal material exhibits the property of rotating the polarization plane of transmitted light in response to application of an electric field across said liquid crystal material, a front electrode disposed on the interior surface of the front support member, which front electrode comprises a layer of electrical conductive material transmissive to light, a back electrode disposed on the interior surface of the back support member, which back electrode comprises a plurality of spaced-apart light transmissive electrical conductive contacts, a thin film transistor array disposed on the interior surface of the back support member between the back electrode contacts, with individual transistors electrically connected to an individual back electrode contact, whereby potential is selectively addressable to the back electrode contacts to thereby scan and modulate the rotation property of the liquid crystal material, a first linear light polarizer disposed on the exterior surface of the back support member, a second linear light polarizer disposed on the exterior surface of the front support member, with the second polarizer oriented in the same direction as the first polarizer, a color filter member disposed on the exposed surface of the first polarizer and comprising a plurality of spatially positioned different color filters in which individual color filters are aligned and associated with individual back electrode contacts so that only one primary color illuminates the individual back electrode contact, a light source and means proximate the color filter member for directing substantially parallel light through the color filter member.

* * * * *